W. E. HOWSER & A. M. WOLTZ.
TIRE FILLER.
APPLICATION FILED OCT. 27, 1911.
1,038,891. Patented Sept. 17, 1912.
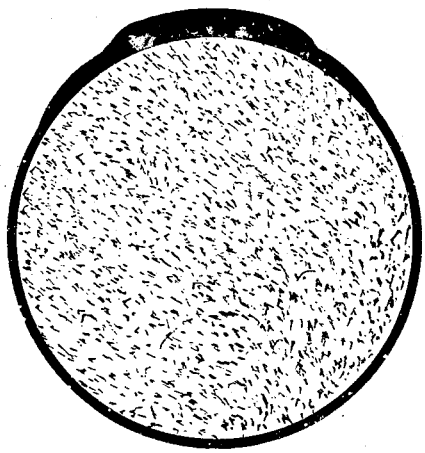

UNITED STATES PATENT OFFICE.

WILLIAM EDGAR HOWSER AND ALBERT M. WOLTZ, OF GREENSBORO, NORTH CAROLINA.

TIRE-FILLER.

1,038,891.  Specification of Letters Patent.  Patented Sept. 17, 1912.

Application filed October 27, 1911. Serial No. 657,153.

*To all whom it may concern:*

Be it known that we, WILLIAM EDGAR HOWSER and ALBERT M. WOLTZ, citizens of the United States, residing at Greensboro, in the county of Guilford, State of North Carolina, have invented certain new and useful Improvements in Tire-Fillers, of which the following is a specification.

As is well known, the greatest expense in connection with a motor vehicle is the pneumatic tire owing to the fact that it is easily punctured, and frequently "blows out" in hot weather as the air in the tube is heated to a high temperature due to the friction between the shoe and the surface of the road.

The object of our invention is to entirely eliminate what is known as "tire trouble" by producing a tire that is puncture and "blow out" proof and at the same time provides a cushion effect equal to air.

Our invention consists in a certain composition adapted to be poured in a rubber tire tube and serve as a cushion; said composition being far superior to rubber as it will not decay, freeze, dry out, because hard with age, or lose its resilient qualities under any condition.

The illustration is a transverse sectional view of a tire embodying our invention.

Our invention consists primarily in a filler for rubber tire tubes composed of pulverized cork or any light material such as saw-dust, wood pulp or the like, sulfur and corn oil. Of the light materials we prefer to use pulverized cork. The preferred composition consists of 1 part pulverized cork, 8.5 parts sulfur, 30.5 parts corn oil.

It will of course be understood that we may vary the proportions of ingredients and the temperatures given, more or less.

The method of compounding our filler is as follows: The corn oil is first heated to a temperature of from 310 to 320 degrees F. (more or less), then the sulfur is added and this composition is kept at the same temperature for a period of thirty minutes, then the cork (or other light material) is added and this composition is kept at the same temperature for a period of fifteen minutes making in all forty five minutes of heat of from 310 to 320 degrees F. We then have a semi-liquid composition which we force into a rubber tire tube while heated to 310 degrees. The composition is allowed to cool in said tube, and when the composition is cool, the tire is ready for use. The cork is inherently resilient; consequently, it is permanently elastic even under compression. This quality, in addition to the fact that cork has more or less resin, gives it more or less affinity for vegetable oil; therefore, we secure, for all practical purposes, a perfect union between the two.

Our composition has all the resilient and elastic qualities of rubber but will not harden like rubber does. It will not freeze, dry out, become hard from age or lose its resiliency and elasticity under any conditions. It will not flatten or twist out of shape in or out of use.

A tire built according to our invention has the exterior appearance of a pneumatic tire; its cushion effect is equal to the pneumatic tire; and it eliminates all tire troubles.

The tire and the method herein described form the subject matter of divisional applications filed May 3, 1912, Serial Numbers 694,956 and 694,957.

What we claim is:—

1. A filler for tubular rubber tires, consisting of pulverized cork, sulfur and corn oil.

2. A composition for filling tubular rubber tires consisting of 1 part pulverized cork, 8.5 parts of sulfur and 30.5 parts corn oil thoroughly intermingled.

In testimony whereof we affix our signatures in presence of two witnesses.

WILLIAM EDGAR HOWSER.
ALBERT M. WOLTZ.

Witnesses:
H. P. LEAK,
WM. J. HALLADAY.